(12) United States Patent
Yun et al.

(10) Patent No.: US 12,069,818 B2
(45) Date of Patent: Aug. 20, 2024

(54) SOLID STATE DRIVE CASE AND SOLID STATE DRIVE DEVICE USING THE SAME

(71) Applicant: SAMSUNG ELECTRONICS CO., LTD., Suwon-si (KR)

(72) Inventors: Ilhan Yun, Anyang-si (KR); Sungki Lee, Seoul (KR); Suin Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/715,385

(22) Filed: Apr. 7, 2022

(65) Prior Publication Data

US 2023/0043293 A1 Feb. 9, 2023

(30) Foreign Application Priority Data

Aug. 6, 2021 (KR) .................. 10-2021-0103805

(51) Int. Cl.
*H05K 5/02* (2006.01)
(52) U.S. Cl.
CPC .................. *H05K 5/0208* (2013.01)
(58) Field of Classification Search
CPC ........................................... H05K 7/00
See application file for complete search history.

(56) References Cited

U.S. PATENT DOCUMENTS

| 9,497,868 B2 | 11/2016 | Guarneros Jones et al. |
| 2005/0106339 A1 | 5/2005 | Baker |
| 2016/0314721 A1* | 10/2016 | Hasegawa ............. G09F 3/0292 |

FOREIGN PATENT DOCUMENTS

| CN | 104973278 | 10/2015 |
| JP | 2009037694 A * | 2/2009 |
| JP | 2018-086522 | 6/2018 |
| KR | 10-2015-0070724 | 6/2015 |
| KR | 10-2018-0006350 | 1/2018 |

* cited by examiner

*Primary Examiner* — Jerry Wu
(74) *Attorney, Agent, or Firm* — F. CHAU & ASSOCIATES, LLC (57) ABSTRACT

A solid state drive case includes a lower cover having a sidewall defining an internal space. The sidewall includes a protrusion disposed on an end portion of the sidewall. An upper cover has a first surface directly contacting the sidewall of the lower cover and a second surface opposite to the first surface. The upper cover has a hole overlapping the protrusion and configured to receive the protrusion. A sealing label is attached to the second surface of the upper cover. The sealing label has an area that is less than an area of an entirety of the second surface of the cover. At least a portion of the sealing label is attached to an end portion of the protrusion.

20 Claims, 8 Drawing Sheets

SOLID STATE DRIVE CASE AND SOLID STATE DRIVE DEVICE USING THE SAME

CROSS-REFERENCE TO RELATED APPLICATIONS

This application claims priority under 35 U.S.C. § 119 to Korean Patent Application No. 10-2021-0103805, filed on Aug. 6, 2021 in the Korean Intellectual Property Office, the disclosure of which is incorporated by reference in its entirety herein.

1. Technical Field

The present disclosure relates to a solid state drive case and a solid state drive device using the same.

2. Discussion of Related Art

A solid state drive device is attracting attention as a next-generation storage device to replace a conventional hard disk drive. The solid state drive device is a storage device based on a non-volatile memory that has a relatively low power consumption and a relatively high storage density. In addition, when a solid state drive device is used as a storage device, it is possible to input and output a large amount of data at high speed.

As a demand for solid state drive devices and the scope of application of solid state drive devices is expanding, the use thereof is becoming increasingly common in fields requiring a high level of security. Accordingly, there is an increased demand for preventing data extraction by falsifying a solid state drive device.

SUMMARY

An aspect of the present disclosure is to provide a solid drive case able to be checked using disassembly and which can be mass-produced by an automated process, and a solid state drive device using the same.

According to an embodiment of the present disclosure, a solid state drive case includes a lower cover having a sidewall defining an internal space. The sidewall includes a protrusion disposed on an end portion of the sidewall. An upper cover has a first surface directly contacting the sidewall of the lower cover and a second surface opposite to the first surface. The upper cover has a hole overlapping the protrusion and configured to receive the protrusion. A sealing label is attached to the second surface of the upper cover. The sealing label has an area that is less than an area of an entirety of the second surface of the cover. At least a portion of the sealing label is attached to an end portion of the protrusion.

According to an embodiment of the present disclosure, a solid state drive case includes a first cover having a first surface including an identification region and a second surface opposite to the first surface. The first cover includes a groove portion disposed in the identification region and penetrating through the first and second surfaces. A second cover is coupled to the first cover to form an internal space and has a protrusion configured to be inserted into the groove portion. A sealing label is attached to the identification region. An end portion of the protrusion is exposed to the first surface and is attached to the sealing label.

According to an embodiment of the present disclosure, a solid state drive device includes a first cover having a first surface and a second surface opposite to the first surface. The first cover includes an identification region and a groove portion disposed in the identification region and penetrating through the first and second surfaces. A second cover is coupled to the first cover to form an internal space and includes a protrusion configured to be inserted into the groove portion. A sealing label is attached to the identification region. A substrate module has a non-volatile memory and is accommodated in the internal space. An end portion of the protrusion is exposed to the first surface and is attached to the sealing label.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION OF EMBODIMENTS

Hereinafter, non-limiting embodiments of the present disclosure will be described with reference to the accompanying drawings.

Figure 1:
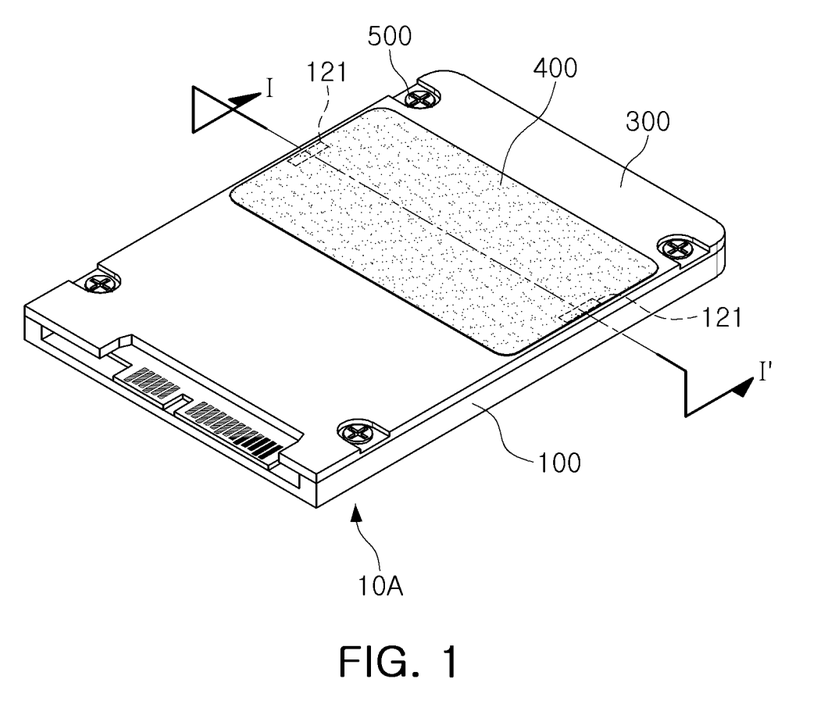
FIG. 1 is a perspective view of a solid state drive device according to an embodiment of the present disclosure.
Figure 2:
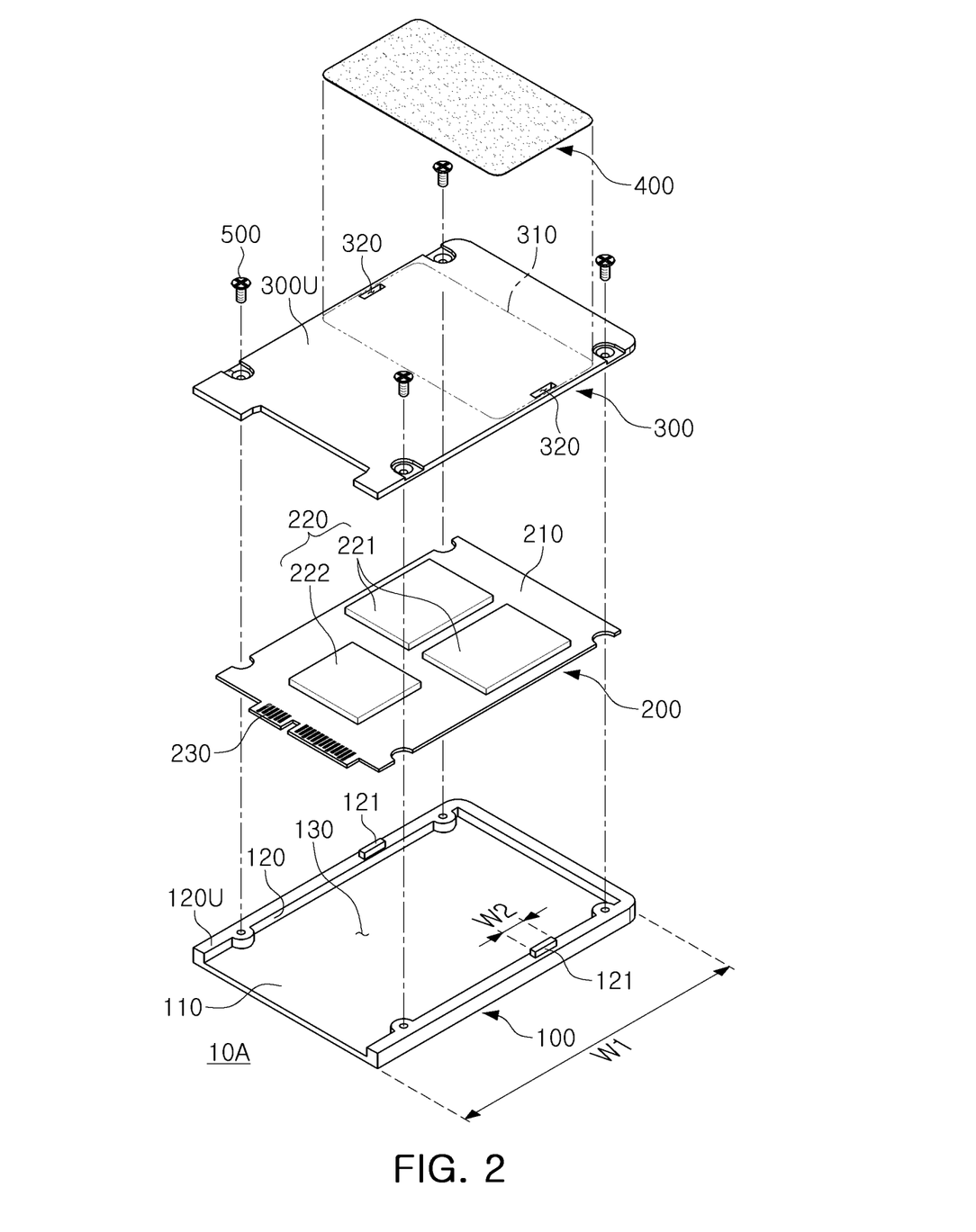
FIG. 2 is an exploded perspective view of a solid state drive device according to an embodiment of the present disclosure.
Figure 3:
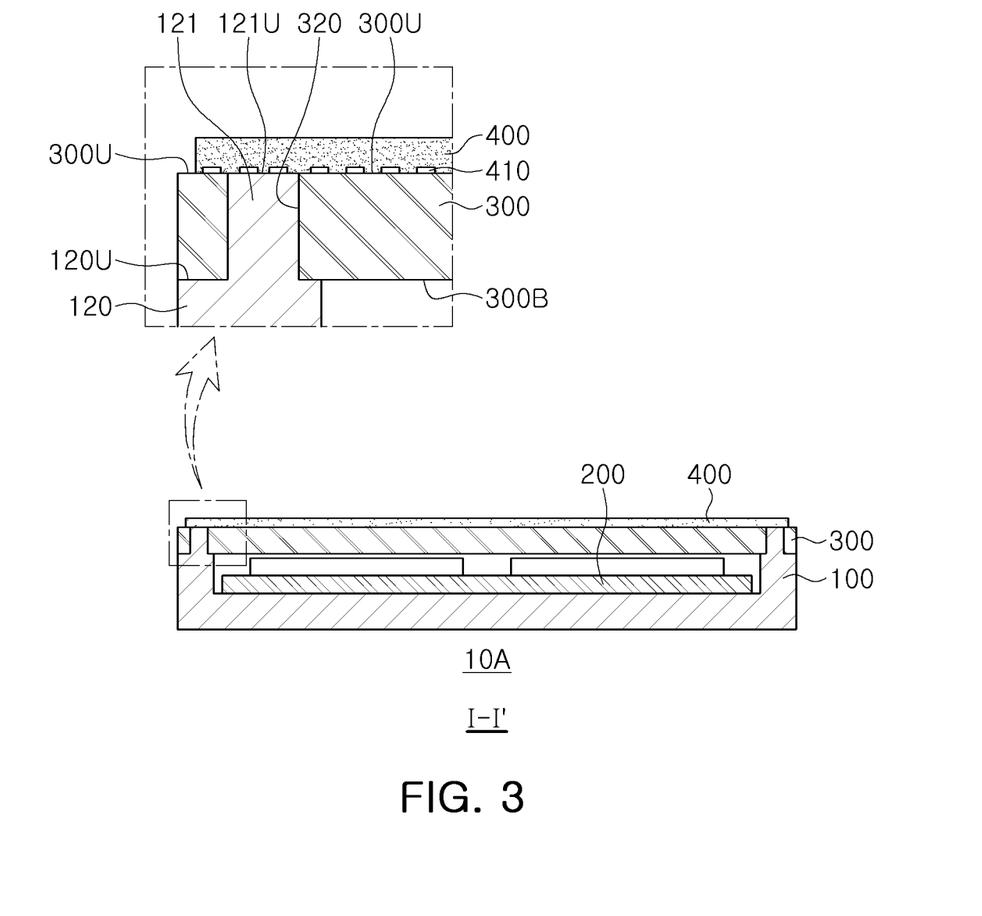
FIG. 3 is a cross-sectional view of a solid state drive device taken along line I-I' of FIG. 1 according to an embodiment of the present disclosure.
Figure 4:
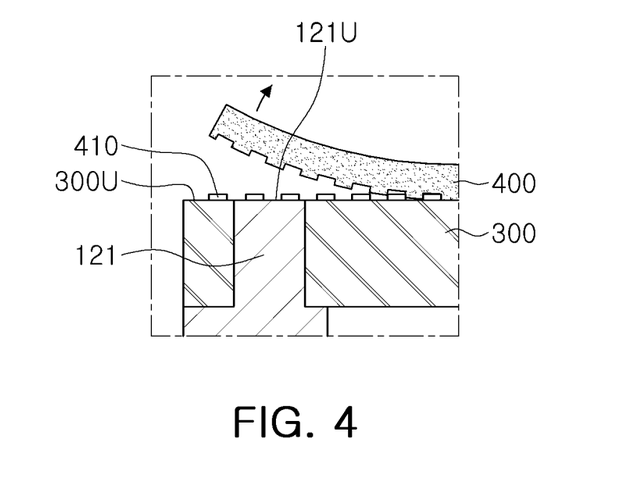
FIG. 4 is a cross-sectional view illustrating that the sealing label of FIG. 3 is separated and a trace thereof is left on an upper cover and a protrusion.
Figure 5:
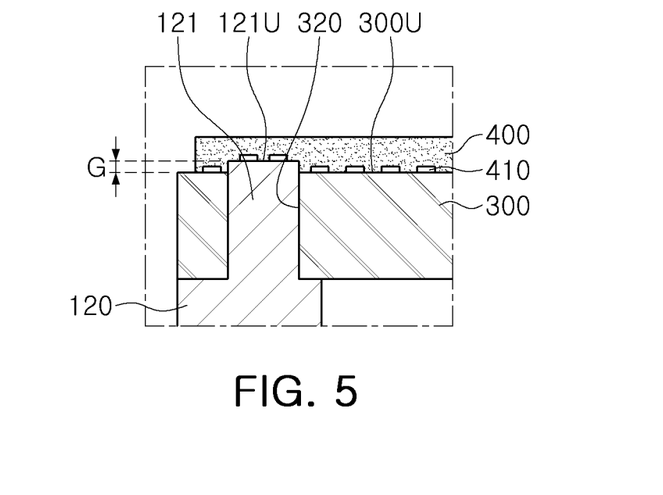
FIGS. 5 to 7 are cross-sectional views showing modified embodiments of the protrusion of FIG. 2 according to the present disclosure.
Figure 6:
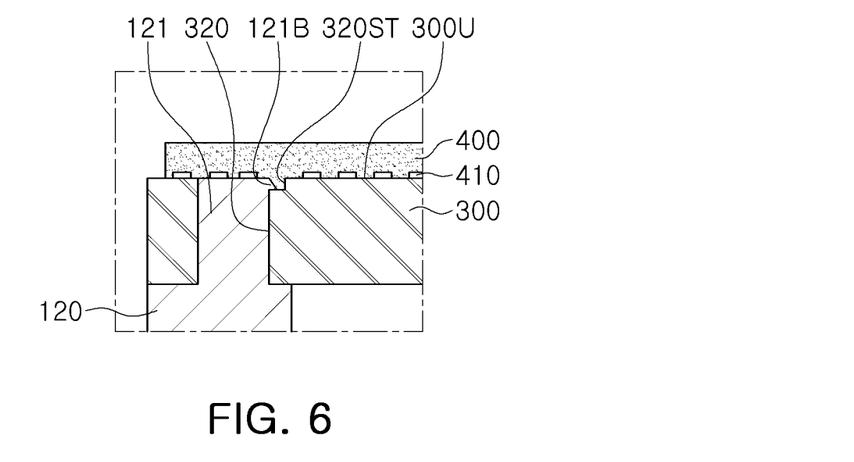
Figure 7:
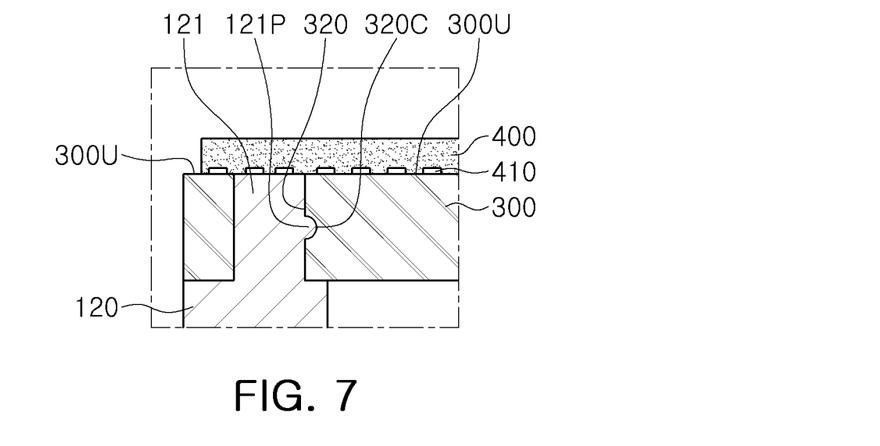

A solid state drive device 10A according to an embodiment of the present disclosure will be described with reference to FIGS. 1 to 4. FIG. 1 is a perspective view of a solid state drive device according to an embodiment of the present disclosure, and FIG. 2 is an exploded perspective view of a solid state drive device according to an embodiment of the present disclosure. FIG. 3 is a cross-sectional view taken along line I-I' of FIG. 1, and FIG. 4 is a view illustrating that the sealing label of FIG. 3 is separated and a trace thereof is left on an upper cover and a protrusion. FIGS. 5 to 7 are modified examples of the protrusion of FIG. 2.

Referring to FIGS. 1 and 2, the solid state drive device 10A according to an embodiment may include a lower cover 100 having a protrusion 121, a substrate module 200, an upper cover 300 having a hole 320 into which the protrusion 121 is inserted, and a sealing label 400 covering the upper cover 300. The sealing label 400 may be a label comprised of paper, plastic or other known materials and includes an adhesive on a bottom surface for securing the sealing label 400 to a surface. Since the configuration of the solid state drive device 10A excluding the substrate module 200 may be understood as being a solid state drive case, the solid state drive device 10A will be described hereinafter, and a description of the solid state drive case by itself will be omitted for convenience of explanation.

The substrate module 200 may include a substrate 210, a plurality of semiconductor chips 220 mounted on the substrate 210, and an external connector 230. In an embodiment, the substrate module 200 may be, for example, a single in-line memory module (SIMM) in which a plurality of semiconductor chips 220 are mounted on an upper surface of the substrate 210. However, embodiments of the present disclosure are not limited thereto. For example, in an embodiment, the substrate module 200 may be a dual in-line memory module (DIMM) in which a plurality of semiconductor chips 220 are mounted on upper and lower surfaces of the substrate 210, respectively.

In an embodiment, the substrate 210 may be a printed circuit board. For example, the substrate 210 may be a double-sided printed circuit board or a multilayer printed circuit board.

In an embodiment as shown in FIG. 2, the plurality of semiconductor chips 220 may include a plurality of memory semiconductor chips 221 and at least one controller chip 222.

In an embodiment, the plurality of memory semiconductor chips 221 may be non-volatile memory devices. For example, the non-volatile memory devices may be a flash memory, a phase-change RAM (PRAM), a resistive RAM (RRAM), a ferroelectric memory (FeRAM), a solid-state magnetic memory (MRAM), and the like. However, embodiments of the present disclosure are not limited thereto. For example, in an embodiment, the flash memory may be a NAND flash memory.

In an embodiment, a portion of the plurality of memory semiconductor chips 221 may be volatile memory devices. For example, the volatile memory device may be DRAM, SRAM, SDRAM, DDR RAM, RDRAM, and the like. However, embodiments of the present disclosure are not limited thereto.

The controller chip 222 may provide an interface and a protocol between the plurality of memory semiconductor chips 221 and a host, such as a computer server, employing a solid-state drive device. In an embodiment, the controller chip 222 may provide an interface between the plurality of memory semiconductor chips 221 and the host by a peripheral component interconnect express (PCIe), a remote direct memory access (RDMA) via Ethernet, a Serial Advanced Technology Attachment (SATA), Fibre Channel, Serial Attached SCSI (SAS), or Nonvolatile Memory Express (NVMe), or by a standard protocol such as Ethernet or Universal Serial Bus (USB). However, embodiments of the present disclosure are not limited thereto. The controller chip 222 may also perform wear leveling, garbage collection, bad block management and error correcting code (ECC) for the plurality of memory semiconductor chips 221.

An external connector 230 may be disposed at one end of the substrate 210. The external connector 230 may connect the solid state drive device 10A with a host to exchange signals and/or receive power. A plurality of wiring lines may be formed in the external connector 230. The external connector 230 may follow, for example, a peripheral component interconnect express (PCIe), a remote direct memory access (RDMA) via Ethernet, a Serial Advanced Technology Attachment (SATA), Fibre Channel, Serial Attached SCSI (SAS), or Nonvolatile Memory Express (NVMe), or may provide a standard interface such as Ethernet or Universal Serial Bus (USB).

The lower cover 100 and the upper cover 300 may be coupled to each other to form an internal space 130 in which the substrate module 200 is accommodated. For example, the lower cover 100 and the upper cover 300 may be housings surrounding the outside of the substrate module 200.

In an embodiment, the lower cover 100 and the upper cover 300 may be formed in a rectangular shape having a relatively long side in a first direction and a relatively short side in a second direction that is perpendicular to the first direction. However, embodiments of the present disclosure are not limited thereto. For example, in an embodiment, the lower cover 100 and the upper cover 300 may be formed to have various different shapes, such as according to a shape of the substrate module 200 accommodated therein. In an embodiment, each of the lower cover 100 and the upper cover 300 may be formed of a single material, or may be formed of a composite material in which different materials are combined in consideration of heat transfer characteristics. In addition, the lower cover 100 and the upper cover 300 may be formed of an elastic material to facilitate coupling. In an embodiment, the lower cover 100 and the upper cover 300 may be formed of, for example, metal, a carbon-based material, a polymer material, or a combination thereof. However, embodiments of the present disclosure are not limited thereto. For example, in an embodiment, the lower cover 100 and the upper cover 300 may be formed of copper (Cu), aluminum (Al), zinc (Zn), tin (Sn), stainless steel, or a clad metal including the same. In an embodiment, the lower cover 100 and the upper cover 300 may be formed of, for example, graphite, graphene, carbon fiber, a carbon nanotube composite (CNT composite) material, or the like. In an embodiment, the lower cover 100 and the upper cover 300 may be formed of, for example, an epoxy resin, and a polymer material such as polymethylmethacrylate (PMMA), polycarbonate (PC), polyethylene (PE), polypropylene (PP), and the like.

The lower cover 100 and the upper cover 300 may be coupled to each other by a coupling member 500. In an embodiment, the coupling member 500 may be a bolt. However, embodiments of the present disclosure are not limited thereto, and various coupling members such as adhesives, etc., may be used. Also, in an embodiment, the protrusion 121 of the lower cover 100 and the hole 320 of the upper cover 300 may be used as a coupling member and the coupling member 500 may be omitted. This will be described later.

Referring to FIGS. 2 and 3, the lower cover 100 may include a bottom portion 110 and a sidewall 120 extending from the bottom portion 110. The bottom portion 110 and the sidewall 120 may form an internal space 130 in which the substrate module 200 is accommodated together with the upper cover 300.

In an embodiment, the sidewall 120 may be formed to extend perpendicularly to an edge of the bottom portion 110. However, embodiments of the present disclosure are not limited thereto. In an embodiment as shown in FIG. 2, the sidewall 120 may be comprised of one integral sidewall. However, embodiments of the present disclosure are not limited thereto, and a plurality of sidewalls may be separately disposed on the bottom portion 110. In an embodiment, the upper surface 120U of the sidewall 120 is a region that directly contacts the upper cover 300, and a protrusion 121 may be disposed on a portion of the upper surfaces 120U.

At least one protrusion 121 may be disposed on the upper surface 120U of the sidewall 120. However, embodiments of the present disclosure are not limited thereto. For example, in an embodiment, the protrusion 121 may be separated from the sidewall 120 to be formed as a separate structure. For example, the protrusion 121 may be formed on the bottom portion 110. The protrusion 121 may be formed to have a cross-sectional area sufficient to be inserted into the hole 320 of the upper cover 300. The protrusion 121 may be formed in a shape corresponding to the shape of the hole 320 to be easily inserted into and received by the hole 320. For example, in an embodiment, the protrusion 121 may have a cross-section having one of various shapes, such as a circle, a triangle, a square, and a pentagon. However, embodiments of the present disclosure are not limited thereto.

In addition, in an embodiment, the protrusion 121 may be formed to have a thickness substantially equal to a thickness of the upper cover 300 such that an end portion 121U (e.g., an upper portion in a thickness direction) is substantially coplanar with the upper surface 300U of the upper cover 300. However, embodiments of the present disclosure are not limited thereto and the end portion 121U of the protrusion 121 may not be substantially coplanar with the upper surface 300U of the upper cover 300 in some embodiments. Referring to FIG. 5, the end portion 121U of the protrusion 121 may have a step difference G such that the sealing label 400 attached to the upper surface 300U of the upper cover 300 may be securely attached to the end portion 121U of the protrusion 121 as well. For example, in an embodiment, the end portion 121U of the protrusion 121 may have a step difference of about: 0.2 mm from the upper surface 310U of the upper cover 300. For example, the end portion 121U of the protrusion 121 may be recessed with a step difference G of about 0.2 mm or less, or as shown in an embodiment of FIG. 5 protrude with a step difference G of about 0.2 mm or less, from the upper surface 310U of the upper cover 310.

In an embodiment, the end portion 121U of the protrusion 121 may be formed as a relatively flat surface so that the sealing label 400 may be easily attached in a secure manner. In addition, the end portion 121U of the protrusion 121 may be formed to have a size (e.g., length) sufficient for the sealing label 400 to be attached. For example, the end portion 121U of the protrusion 121 may be formed to have a size W2 in a range of about 10% to about 90% of the size W1 of the lower cover 100 in a longitudinal direction (see FIG. 2).

Referring to FIG. 3, the end portion 121U of the protrusion 121 may be attached to the sealing label 400 through the hole 320 of the upper cover 300. Accordingly, the end portion 121U of the protrusion 121 may be used as an identification region to which the sealing label 400 is attached. As illustrated in FIG. 4, in an instance in which the settling label 400 is separated from the upper surface 300U of the upper cover 300 by external force, a printed layer 410 of the sealing label 400 may remain on the upper surface 300U of the upper cover 300 and the end portion 121U of the protrusion 121, respectively. The printed layer 410 may refer to a trace (e.g., residue) left by the sealing label 400 being separated from an adhesive surface. Accordingly, the region in which the printed layer 410 remains may indicate the removal of the sealing label 400 from that region after the sealing label 400 is initially attached. The sealing label 400 will be described later.

A shape of the protrusion 121 may be variously modified. For example, a modified embodiment of the protrusion will be described with reference to FIGS. 6 and 7. In FIGS. 6 and 7, only the shape of the protrusion is changed, and other elements are substantially the same us those of the above-described embodiment, so the description of elements other than the protrusion may be omitted for convenience of explanation. The protrusion 121 of the above-described embodiment of FIG. 4 provided only an identification region to which the sealing label 400 is attached. However, in embodiments shown in FIGS. 6 and 7, the protrusion 121 may also provide a function of a coupling member for coupling the upper cover 300 and the lower cover 100 together.

In an embodiment, as shown in FIG. 6, a stepped portion 320ST may be formed around a hole 320 disposed on an upper surface 300U of the upper cover 300, and a hook 121B that is fixed to the stepped portion 320ST may be formed on an end portion of the protrusion 121 of the lower cover 100. Accordingly, when the hole 320 of the upper cover 300 and the protrusion 121 of the lower cover 100 are aligned to face each other and that pressurized towards each other, after a hook 121B of the protrusion 121 passes through the hole 320 by elasticity, it may be fixed to the stepped portion 320ST. Accordingly, the lower cover 100 and the upper cover 300 may be coupled only with the protrusion 121 and without a separate coupling member (e.g., coupling member 500 in FIG. 2).

In an embodiment, as shown in FIG. 7, a concave portion 320C may be formed on an inner side wall of the hole 320 of the upper cover 300, and a convex portion 121P formed on a side surface of the protrusion 121 of the lower cover 100 may be received in the concave portion 320C to couple the lower cover 100 and the upper cover 300 to each other. Accordingly, when the hole 320 of the upper cover 300 and the protrusion 121 of the lower cover 100 are aligned to face each other and then pressurized towards each other, the convex portion 121P of the protrusion 121 may be received in the concave portion 320C inside the hole 320 by elasticity. Accordingly, the lower cover 100 and the upper cover 300 may be coupled by the protrusion 121 without a separate coupling member.

The upper cover 300 may cover the lower cover 100 to form an internal space 130. In an embodiment, the upper cover 300 may have an identification region 310 formed on a partial region of the upper surface 300U of the upper cover. The sealing label 400 is attached to the identification region 310 which has an area that is less than the area of the entirety of the upper surface 300U of the upper cover. In an embodiment, the identification region 310 may be formed as a relatively flat surface so that the sealing label 400 is relatively easily attached in a secure manner. A hole 320 into which the protrusion 121 is inserted may be formed in the identification region 310. The hole 320 may be formed to extend through the upper surface 300U and the lower surface 300B of the upper cover 300.

A sealing label 400 may be attached to the identification region 310 of the upper cover 300. The sealing label 400 permits the determination of whether the lower cover 100 and the upper cover 300 are separated after being initially coupled to each other. In an instance in which the lower cover 100 and the upper cover 300 are separated from the identification region 310 by external force, a printed layer 410 may be left in an end portion 121U of the protrusion 121. In addition, in an instance in which the lower cover 100 and the upper cover 300 are separated by an external force, the printed layer 410 may be left in the identification region 310. Additionally, a character or a pattern may be exposed on a surface of the sealing label 400. The sealing label 400 may be variously employed as long as it is separable from an adhesive surface and can leave traces such as the printed layer 410.

In an embodiment, the sealing label 400 may be disposed to cover only the identification region 310 of the upper cover 300. For example, the sealing label 400 may be attached only to an upper surface of the solid state drive device 10A, and may not be attached to side and lower surfaces of the solid state drive device 10A. As described above, in an embodiment, since the sealing label 400 is attached only to the identification region 310 disposed on the upper surface 300U of the upper cover 300, it is relatively easy to automate the process of attaching the sealing label 400 as compared to embodiments in which the sealing label 400 is applied to surround an upper surface and a side surface of the solid state drive device 10A, or the sealing label 400 is applied to surround an upper surface, a side surface, and a lower surface thereof.

Figure 8:
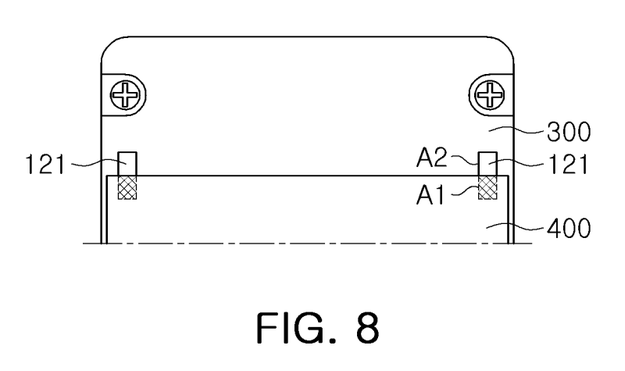
FIG. 8 is a modified embodiment of the sealing label of FIG. 1 according to the present disclosure.

In an embodiment, the sealing label 400 may be formed to have a larger area than the hole 320 so as to completely cover the end portion 121U of the protrusion 121 exposed in the hole 320 of the upper cover 300. In an embodiment, the sealing label 400 may be formed to have an area that is at least about 20% greater than an area of the end portion 121U of the protrusion 121. However, embodiments of the present disclosure are not limited thereto. For example, in an embodiment, the sealing label 400 may be attached to cover only a portion of the end portion 121U of the protrusion 121. Referring to FIG. 8, the sealing label 400 may be attached to cover only a partial region A1 forming the end portion 121U of the protrusion 121 and the sealing label 400 may not cover partial region A2 of the end portion 121U of the protrusion 121. If the area of the partial region A1 that directly contacts the sealing label 400 among the end portions 121U of the protrusion 121 is excessively reduced, the sealing label 400 may not be securely attached to the end portion 121U of the protrusion 121. In an embodiment, the area of the partial region A1 to which the sealing label 400 is attached may be in a range of about 20% or more of the area of the entirety of the end portion 121U of the protrusion.

In an instance in which the sealing label 400 is separated from the identification region 310 by an external force, the printed layer 410 may be left in the identification region 310. Accordingly, in an instance in which the sealing label 400 is removed, the printed layer 410 is left on the upper surface 300U of the upper cover 300 and the end portion 121U of the protrusion 121 of the lower cover 100. Thereby, it may be confirmed that an unauthorized person has disassembled the solid state drive device 10A, such as by uncoupling the upper and lower covers 300, 100 from each other, and physically accessed the substrate module 200.

For the prevention of forgery of the solid state drive device 10A, security regulations, for example, in the United States Federal Information Processing Standard (FIPS) 140-2 Level 2, when the sealing label 400 is removed, it is required that traces such as the printed layer 410 remain on both the lower cover 100 and the upper cover 300 surrounding the substrate module 200. In an embodiment, the sealing label 400 of the solid state drive device 10A is configured so that traces such as the printed layer 410 are left on both the lower cover 100 and the upper cover 300 when the sealing label 400 is removed, so that security regulations such as FIPS 140-2 level 2 may be satisfied.

Figure 9:
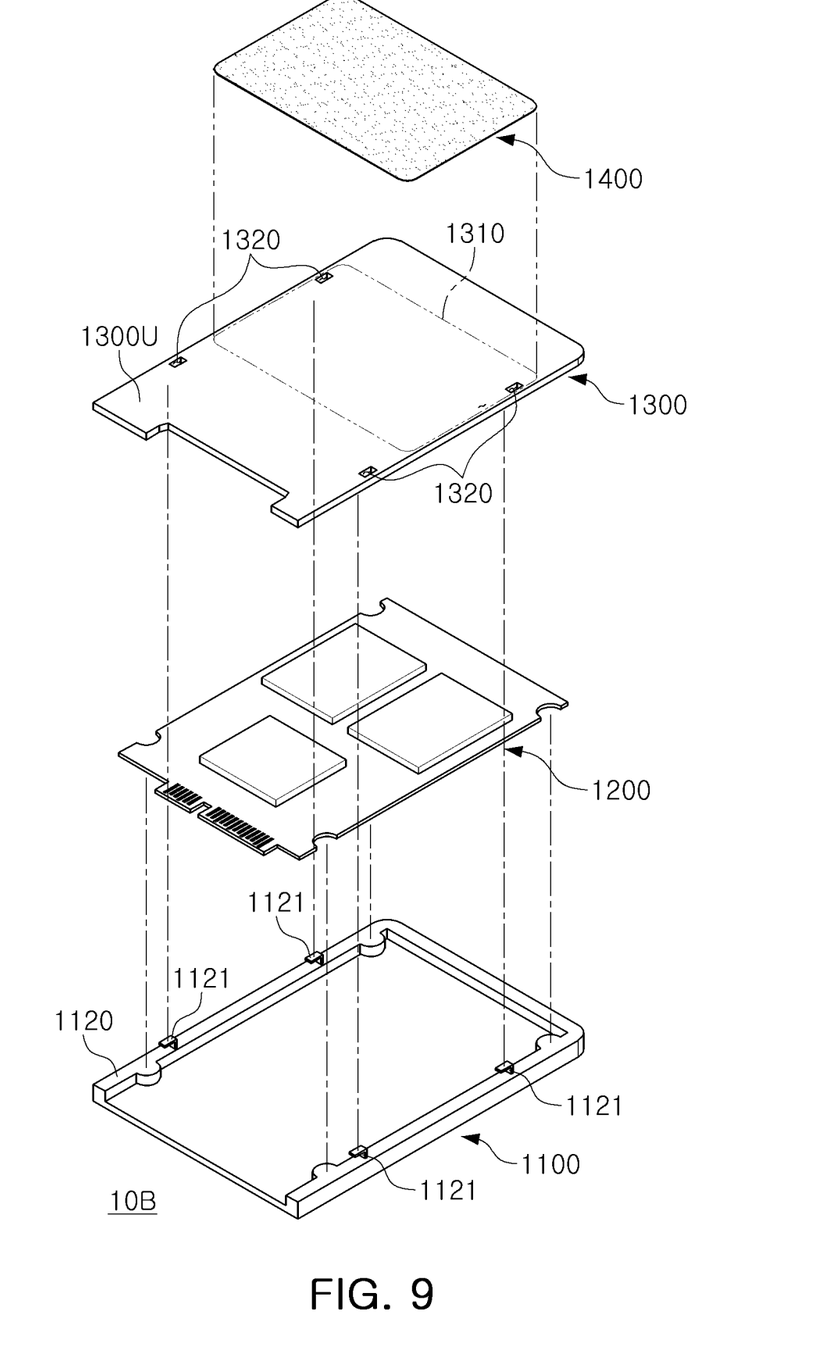
FIG. 9 is an exploded perspective view of a solid state drive device according to an embodiment of the present disclosure.

A solid state drive device according to an embodiment of the present disclosure will be described with reference to FIG. 9. FIG. 9 is an exploded perspective view of a solid state drive device according to an embodiment of the present disclosure.

Compared to the solid state drive device 10A of the above-described embodiment shown in FIG. 2, in a solid state drive device 10B of FIG. 9, at least one protrusion 1121 is formed on a sidewall 1120 of a lower cover 1100 in a latch form, and the protrusion 1121 penetrates through a hole 1320 of an upper cover 1300 to be slidably coupled to an upper surface 1300U of the upper cover 1300. Accordingly, the lower cover 1100 and the upper cover 1300 may only be coupled to each other by the protrusion 1121 without a separate coupling member. The sealing label 1400 may be attached in a state in which the protrusion 1121 is slidably coupled to the upper surface 1300U of the upper cover 1300. Since the substrate module 1200 and the sealing label 1400 have the same configuration as the substrate module 200 and the sealing label 400 of the above-described embodiment, a detailed description thereof will be omitted for convenience of explanation.

Figure 10:
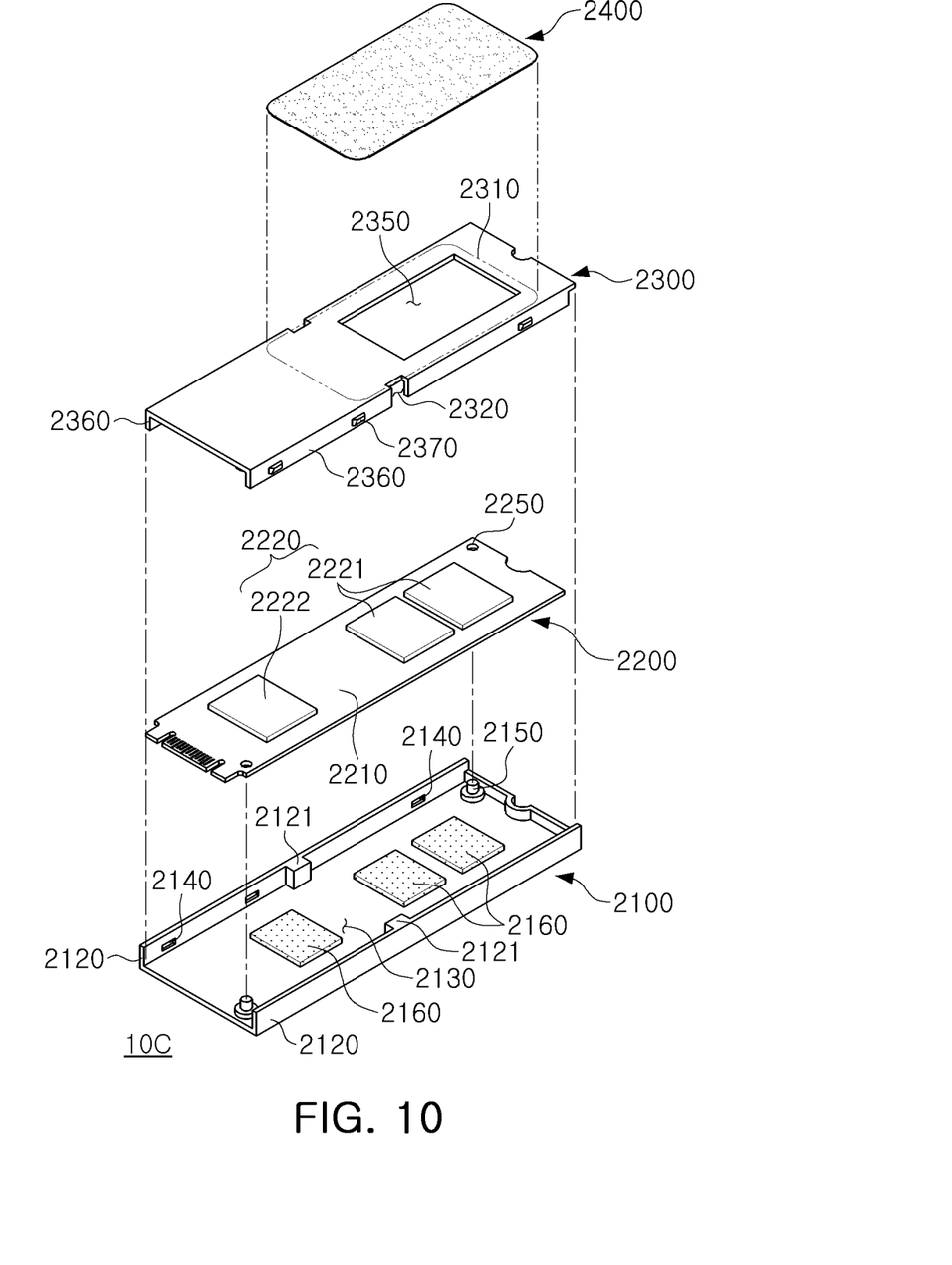
FIG. 10 is an exploded perspective view of a solid state drive device according to an embodiment of the present disclosure.

Referring to FIG. 10, a solid state drive device 10C according to an embodiment of the present disclosure will be described. FIG. 10 is an exploded perspective view of a solid state drive device according to an embodiment of the present disclosure. Since a substrate module 2200 and a sealing label 2400 have the same configuration as the substrate module 200 and the sealing label 400 of the above-described embodiment shown in FIG. 2, a detailed description thereof will be omitted for convenience of explanation. A plurality of semiconductor chips 2220 may be disposed on an upper surface of the substrate module 2200. The plurality of semiconductor chips 2220 may include a plurality of memory semiconductor chips 2221 and at least one controller chip 2222. The plurality of memory semiconductor chips 2221 may be non-volatile memory devices. In an embodiment, a coupling groove 2250 may be formed at an edge of the substrate module 2200. The coupling groove 2250 may be formed at a position corresponding to a fixing protrusion 2150 of a lower cover 2100 to fix the substrate module 2200 to an internal space 2130 of the lower cover 2100.

Compared to the solid state drive device 10A of the above-described embodiment shown in FIG. 2, in a solid state drive device 10C of an embodiment shown in FIG. 10, there is a difference in that a protrusion 2121 is formed on a sidewall 2120 of the lower cover 2100 to protrude inwardly in a direction towards the internal space 2130, and the protrusion 2121 is coupled to a hole 2320 formed by a recess in which a side surface of an upper cover 2300 is recessed in an inward direction. In addition, an observation window 2350 may be formed in the upper cover 2300, and a plurality of memory semiconductor chips 2221 of the substrate module 2200 may be exposed through the observation window 2350.

In an embodiment, a buffer member 2160 may be disposed on an upper surface of the lower cover 2100. The buffer member 2160 may be disposed between the lower cover 2100 and the substrate module 2200 to reduce an impact transmitted to the substrate module 2200 through the lower cover 2100. According to an embodiment, the buffer member 2160 may be formed of a heat-conducting material to rapidly dissipate heat generated by the substrate module 2200 to the lower cover 2100. The buffer member 2160 may be arranged to correspond to the plurality of memory semiconductor chips 2221 and the controller chip 2222 of the substrate module 2200, and may be attached to a lower surface of the substrate module 2200.

A sealing label 2400 attached to an identification region 2310 of the upper cover 2300 may be attached above the upper cover 2300, the protrusion 2121, and the plurality of memory semiconductor chips 2221. Therefore, it may be determined not only when the lower cover 2100 and the upper cover 2300 are separated, but also when the plurality of memory semiconductor chips 2221 are directly accessed without separating the lower cover 2100 and the upper cover 2300.

A guide portion 2360 may be formed to be bent (e.g., have a curved surface) to correspond to the sidewall 2120 of the lower cover 2100 on both side surfaces of the upper cover 2300. In an embodiment, the curved surface of the guide portion 2360 may abut against the sidewall 2120. A coupling member for coupling the lower cover 2100 and the upper cover 2300 to each other may be disposed on the sidewall 2120 and the guide portion 2360. In an embodiment, a hole 2140 may be formed in the sidewall 2120 of the lower cover 2100, and a hook 2370 that may be fixedly coupled to the hole 2140 may be formed in the guide portion 2360 of the upper cover 2300.

As set forth above, according to the technical idea of the present disclosure, since a sealing label is attached to only one surface of the solid state drive case according to the technical idea of the present disclosure, mass production is relatively easily performed through an automated process, and it may be determined whether the solid state drive case has been disassembled, such as the lower cover and the upper cover being uncoupled from each other.

The various advantages and effects of embodiments of the present disclosure are not limited to the above description.

While non-limiting embodiments have been shown and described above, it will be apparent to those skilled in the art that modifications and variations could be made without departing from the scope of the present disclosure.

What is claimed is:

1. A solid state drive case, comprising:
   a lower cover having a sidewall defining an internal space, the sidewall including a protrusion disposed on an end portion of the sidewall and formed integrally with the sidewall of the lower cover;
   an upper cover having a first surface directly contacting the sidewall of the lower cover and a second surface opposite to the first surface, the upper cover having a hole overlapping the protrusion and configured to receive the protrusion; and
   a sealing label attached to the second surface of the upper cover,
   wherein the sealing label has an area that is less than an area of an entirety of the second surface of the cover, at least a portion of the sealing label is attached to an end portion of the protrusion, and
   wherein the sealing label leaves a residue on the protrusion when the sealing label is removed to indicate that the lower cover and the upper cover were separated from each other after the sealing label was attached to the upper cover.

2. The solid state drive case of claim 1, wherein the end portion of the protrusion is substantially coplanar with the second surface of the upper cover.

3. The solid state drive case of claim 1, wherein:
   the upper cover has a stepped portion disposed on the second surface and positioned adjacent to the hole,
   wherein the end portion of the protrusion has a hook that is configured to be fixed to the stepped portion to couple the upper cover and the lower cover to each other.

4. The solid state drive case of claim 1, wherein:
   the hole has a concave portion disposed on an inner sidewall,
   wherein the protrusion has a convex portion configured to be received into the concave portion to couple the upper cover and the lower cover to each other.

5. The solid state drive case of claim 1, wherein the protrusion has a latch configured to penetrate through the hole and be slidably coupled to the second surface of the upper cover to couple the upper cover and the lower cover to each other.

6. The solid state drive case of claim 1, wherein an area that the sealing label overlaps the end portion of the protrusion is in a range of about 20% to about 100% of an area of an entirety of the end portion of the protrusion.

7. The solid state drive case of claim 1, wherein the sealing label has an area that is at least about 20% greater than an area of and entirety of the end portion of the protrusion.

8. The solid state drive case of claim 1, further comprising,
   a coupling member coupling the upper cover and the lower cover to each other.

9. A solid state drive case, comprising
   a first cover having a first surface including an identification region and a second surface opposite to the first surface, the first cover includes a groove portion disposed in the identification region and penetrating through the first and second surfaces;
   a second cover coupled to the first cover to form an internal space and having a protrusion configured to be inserted into the groove portion, the protrusion is formed integrally with the second cover; and
   a sealing label attached to the identification region,
   wherein an end portion of the protrusion is exposed by the first surface and is attached to the sealing label,
   wherein the sealing label leaves a residue on the protrusion when the sealing label is removed to indicate that the first cover and the second cover were separated from each other after the sealing label was attached to the identification region.

10. The solid state drive case of claim 9, wherein the second cover further comprises:
    a bottom portion; and
    a sidewall extending from the bottom portion,
    wherein the protrusion is disposed on an end portion of the sidewall.

11. The solid state drive case of claim 10, wherein the protrusion protrudes from an end portion of the sidewall towards the first surface of the first cover,
    wherein the groove portion comprises a hole that is configured to receive the protrusion.

12. The solid state drive case of claim 10, Wherein:
    the protrusion protrudes from an end portion of the sidewall towards the internal space,
    wherein the groove portion is a recess that is inwardly recessed from a side surface of the first cover.

13. The solid state drive case of claim 12, wherein the first cover further comprises a guide portion having a curved surface that abuts against the sidewall.

14. The solid state drive ease of claim 13, further comprising,
    a groove portion disposed on the sidewall of the second cover; and
    a hook disposed in the guide portion of the first cover, the hook is configured to be fixed to the groove portion to couple the first and second covers to each other.

15. A solid state drive device, comprising:
    a first cover having a first surface and a second surface opposite to the first surface, the first cover including an identification region and a groove portion disposed in the identification region and penetrating through the first and second surfaces;

a second cover coupled to the first cover to form an internal space and having a protrusion configured to be inserted into the groove portion, the protrusion is formed integrally with the second cover;

a sealing label attached to the identification region;

a substrate module having a non-volatile memory, the substrate module is accommodated in the internal space, wherein an end portion of the protrusion is exposed to the first surface and is attached to the sealing label, and wherein the sealing label leaves a residue on the protrusion when the sealing label is removed to indicate that the first cover and the second cover were separated from each other after the sealing label was attached to the identification region.

16. The solid state drive device of claim 15, wherein:

the non-volatile memory is disposed to face the second surface, and is disposed in a region overlapping the identification region, wherein the first cover further comprises an observation window in the identification region, the observation window exposes the non-volatile memory.

17. The solid state drive device of claim 16, wherein the sealing label is attached to the non-volatile memory through the observation window.

18. The solid state drive device of claim 15, further comprising, a buffer member interposed between the substrate module and the second cover.

19. The solid state drive device of claim 15, wherein the first surface forms a plane, wherein the sealing label has an area that is less than an area of an entirety of the first surface.

20. The solid state drive device of claim 15, wherein the end portion of the protrusion is substantially coplanar with the first surface.

* * * * *